(12) United States Patent
Tracy et al.

(10) Patent No.: US 6,683,258 B1
(45) Date of Patent: Jan. 27, 2004

(54) CABLE RESTRAINING DEVICE

(75) Inventors: David Alan Tracy, Austin, TX (US); Gregory Leighton Rutherford, Leander, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/406,539

(22) Filed: Apr. 3, 2003

(51) Int. Cl.$^7$ ................................................. H01B 7/00
(52) U.S. Cl. ............... 174/135; 174/138 E; 174/138 R; 24/16 R; 24/442; 24/306; 24/304
(58) Field of Search ............................ 174/135, 138 E, 174/138 R; 24/16 R, 442, 306, 304, 309, 374; 248/74.3

(56) References Cited

U.S. PATENT DOCUMENTS

| | | | |
|---|---|---|---|
| 2,723,430 A | * 11/1955 | Renzo | ........................... 24/369 |
| 2,831,049 A | 4/1958 | Cabral | |
| 3,262,663 A | 7/1966 | Jansson | |
| 4,343,525 A | 8/1982 | Knickerbocker | |
| 4,463,999 A | 8/1984 | Knickerbocker | |
| 4,874,908 A | 10/1989 | Johansson | |
| 2003/0034171 A1 | * 2/2003 | Joseph | ........................ 174/135 |

* cited by examiner

Primary Examiner—Dean A. Reichard
Assistant Examiner—Jinhee Lee
(74) Attorney, Agent, or Firm—Alan Ball

(57) ABSTRACT

A detachable binding device comprising a bracket including a base portion and a slotted projection having a first slot and a second slot aligned in parallel with the first slot between the first slot and the base portion. The binding device further includes a self-gripping fastening strip. The fastening strip passes through the first slot to form a first wrap around a length of a cable to hold the cable against the slotted projection. The fastening strip then passes through the second slot to form a second wrap over the first wrap and the length of the cable for secure retention of the cable against the slotted projection by setting the fastening strip into a self-gripping arrangement. After formation, the binding device may be detached from the length of the cable and the bracket by disrupting the self-gripping arrangement of the fastening strip and withdrawing the fastening strip from the second slot and the first slot to release the length of the cable from contact with the slotted projection.

7 Claims, 6 Drawing Sheets

CABLE RESTRAINING DEVICE

BACKGROUND OF THE INVENTION

1. Field of the Invention

The invention relates to wire and cable organizing systems that include tie-down devices at intervals along a length of wire or cable. More particularly the present invention provides a detachable binding device comprising a slotted bracket to receive a fastening strip that has means for mechanical fastening of wraps of the fastening strips around a cable and through slots of the slotted bracket to secure the cable to the bracket.

2. Description of the Related Art

Organized wiring systems, for example a wiring harnesses, provide a convenient means for installing electrical circuit structures that supply energy and electrical signals needed for the operation of a vehicle or a machine. An installer of organized wiring systems in vehicles such as automobiles, airplanes, boats and the like, or in appliances such as clothes washers and dryers, may encounter difficulties due to space limitations inside a vehicle or appliance. The installation of power and signal carrying wires and cables inside an automobile, for example, requires the threading of current carriers through relatively narrow spaces between the interior surface of the passenger compartment and the external surface of the automobile. Space limitation restricts the number and diameters of wires that may be included in a wire bundle that forms part of a wiring harness.

Limitation of space is only one condition that affects the development of an organized wiring system. Conventional bundled wiring harnesses generally require laborious and expensive manufacturing and manual installation procedures that increase the time and expense for mounting a wiring harness on a support structure. Vibration or mechanical shock, produced in a support structure, transmits to the wiring harness and associated cables possibly causing undesirable noise, damage to the wiring harness or loosening of wire bundles and cables from the securing mounts used to hold them to the support structure. In many cases, wire and cable mounts, once formed, do not facilitate reentry for repair or modification of the wiring system.

A variety of devices are known for securing wires and cables to a range of different surfaces. U.S. Pat. No. 2,831,049, for example, describes a wiring harness having a pair of wires mounted within a continuous resilient carrier. The bottom surface of the carrier includes an adhesive coating for securing the carrier to a support structure. U.S. Pat. No. 4,874,408 describes a structure for signal carriers of a wiring harness that includes wires extending through at least two pads. Molded pads surround wires and position them in spaced relationship to each other. The pads also provide attachment of the wires to a support.

Wiring fasteners described in U.S. Pat. No. 3,262,663 include fastener combinations for securing wires, tubes, cables and the like articles to a support surface in the form of a sheet metal panel. The fastener is a stud having a head and a shank secured to the surface of the sheet metal panel at the end of the shank opposite the head. This places the head of the stud in a spaced apart condition from the panel with the undersurface on the head facing inwardly toward the surface of the panel. A clip engaging the head of the stud has an elongated slot to permit insertion of a band passing over an article to be secured to the supporting panel. The band includes locking means for anchoring the band adjacent to the stud.

U.S. Pat. No. 4,463,999 provides information of an apparatus for releasably securing mating electrical connectors. The apparatus employs a bracket having a size and shape to enclose portions of a mating connector, The bracket includes a pair of opposed arm portions with at least one slot centrally located on one of the arms and a pair of opposed open ended slots on the other arm. An end portion of a self-locking strap connects to the centrally located slot. After placing the bracket to enclose the mated connector the self-locking strap may be wound tightly around the connector through the two open-ended slots; and locked to itself, by means of hook and loop elements, to retain the mated connector in an engaged condition. The mating parts of the connector may be conveniently separated after removing the strap, using sufficient force to disengage the hook and loop elements and unwinding the strap from the connector. A similar apparatus provides the subject matter of U.S. Pat. No. 4,343,525.

Regardless of number of ways known for tying elongate objects such as wires and cables, particularly organized wiring systems, to support surfaces, there exists the need for simple, low cost means to releasably secure and retain a variety of optional wiring schemes using simple and compact binding structures.

SUMMARY OF THE INVENTION

The present invention provides a detachable binding device comprising a slotted bracket to receive a fastening strip that has means for mechanical fastening of wraps of the fastening strips around a cable and through slots of the slotted bracket to secure the cable to the bracket. A slotted bracket provides an anchorage point for secure retention of one or more elongate objects, such as a wires or cables particularly electrical cables of a wiring harness. The bracket has two main parts of a base and a slotted projection that includes a pair of parallel slots.

A cable may be secured to a slotted bracket using a flexible fastening strip that has a mechanical fastening means for detachable self-engagement. Other suitable means for self-engagement of fastening strips include adhesive engagement. However, there is an advantage of reliable binding using mechanical fasteners that have interference elements like those found on surfaces of hook and loop fasteners. Mechanical fasteners of this type disengage to release a wire or cable, as needed for repair or re-routing of cable systems. Adhesive means for cable retention are typically not designed for easy, convenient re-entry. Binding structures involving cable ties, for example, do not readily form a tight binding and tend to resist disengagement for re-entry for re-routing or repair of a cable system.

Formation of a cable binding according to the present invention begins by positioning a portion of a length of cable in contact with a first wrap of a flexible fastening strip of mechanical fastener that maintains its wrapped condition by interference and engagement between interference elements on both sides of the fastening strip. A tail extending from the fastening strip has a size suitable for insertion into the first slot in a slotted projection to draw the cable against the projection, which is part of a slotted bracket. The tail may then be wrapped upon itself to form a second wrap of the fastening strip around the cable. Interference between mechanical fastening elements of the first and second wraps of the fastening strip provides relatively secure attachment of the cable to the projection. The tension in the tail of the fastening strip and the holding force applied to the cable increases during formation of a third wrap of the fastening strip around the cable. Formation of the third wrap of the fastening strip requires insertion of the tail through the second slot of the slotted projection followed by tightening the tail around the cable and over the second wrap for engagement of mechanical elements between the second and third wraps of the fastening strip. This wrapping procedure tightly binds a length of the cable to a slotted bracket to produce a detachable cable binding according to the present invention.

An exemplary embodiment of the present invention provides a detachable binding device comprising a bracket including a base portion and a slotted projection having a first slot and a second slot aligned in parallel with the first slot between the first slot and the base portion. The binding device further includes a fastening strip including a first gripping surface and a second gripping surface. A loop of the fastening strip is held around an elongate strand by engagement of the first gripping surface with the second gripping surface. The fastening strip passes through the first slot to form a first wrap around a length of the elongate strand to hold the elongate strand against the slotted projection. Then the fastening strip passes through the second slot to form a second wrap over the first wrap and the length of the elongate strand for secure retention of the elongate strand against the slotted projection when the first gripping surface on an end portion of the fastening strip engages the second gripping surface on a portion of the fastening strip. The binding device detaches from the length of the elongate strand and the bracket by separation of the first gripping surface of the end portion from the second gripping surface of the portion of the fastening strip and withdrawal of the fastening strip from the first slot and the second slot to release the length of the elongate strand from contact with the bracket.

More particularly, the present invention provides a detachable binding device comprising a bracket including a base portion and a slotted projection having a first slot and a second slot aligned in parallel with the first slot between the first slot and the base portion. The binding device further includes a fastening strip having a first side opposite a second side with a plurality of hooks distributed on the first side and a plurality of loops attached to the second side of the fastening strip. The fastening strip passes through the first slot to form a first wrap around a length of a cable, wherein there is contact between the cable and the slotted projection. The fastening strip then passes through the second slot to form a second wrap over the first wrap and the length of the cable for secure retention of the cable against the slotted projection when the fastening strip is under tension, restricted form movement by interlock of a portion of the plurality of hooks at an end portion of the first side, with a portion of the plurality of loops at a portion of the second side of the fastening strip. After formation, the binding device may be detached from the length of the cable and the bracket by separation of the portion of the plurality of hooks at the end portion, of the fastening strip, from the portion of the plurality of loops at the portion of the second side and withdrawal of the fastening strip from the second slot and the first slot to release the length of the cable from contact with the slotted projection.

The above summary of the present invention is not intended to describe each disclosed embodiment or every implementation of the present invention. The Figures and the detailed description which follow more particularly exemplify illustrative embodiments."

BRIEF DESCRIPTION OF THE DRAWINGS

Notwithstanding any other forms, which may fall within the scope or the present invention, preferred forms of the invention will now be described, by way of example only, with reference to the accompanying drawings in which.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
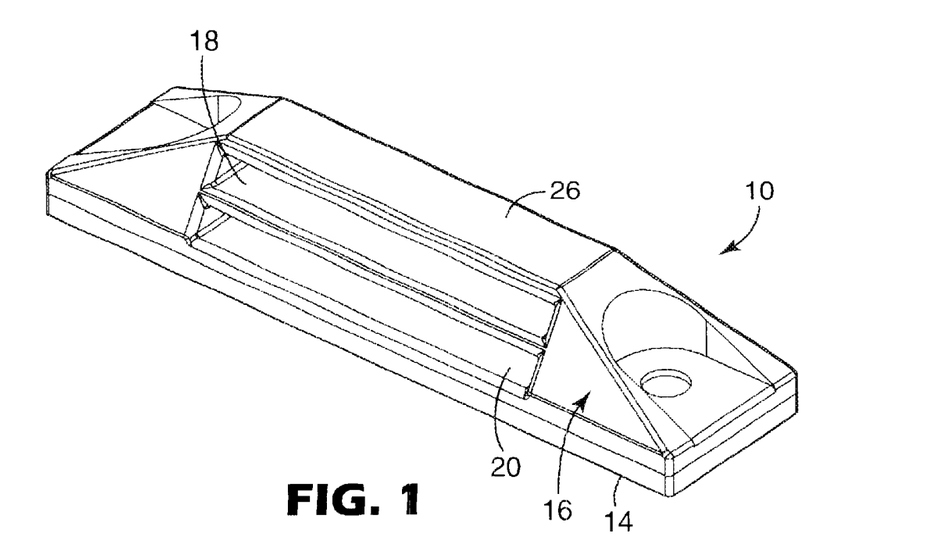
FIG. 1 is a perspective view of slotted bracket according to the present invention.

Referring now to the figures wherein like numbers refer to like parts throughout the several views, FIG. 1 is a perspective view of a bracket 10 according to the present invention. A bracket 10 provides an anchorage point for secure retention of elongate object 12 (not shown) such as a wire or cable particularly an electrical cable that is part of a wiring harness. The bracket 10 includes a base 14 and a slotted projection 16 containing a first slot 18 and a second slot 20.

Figure 2:
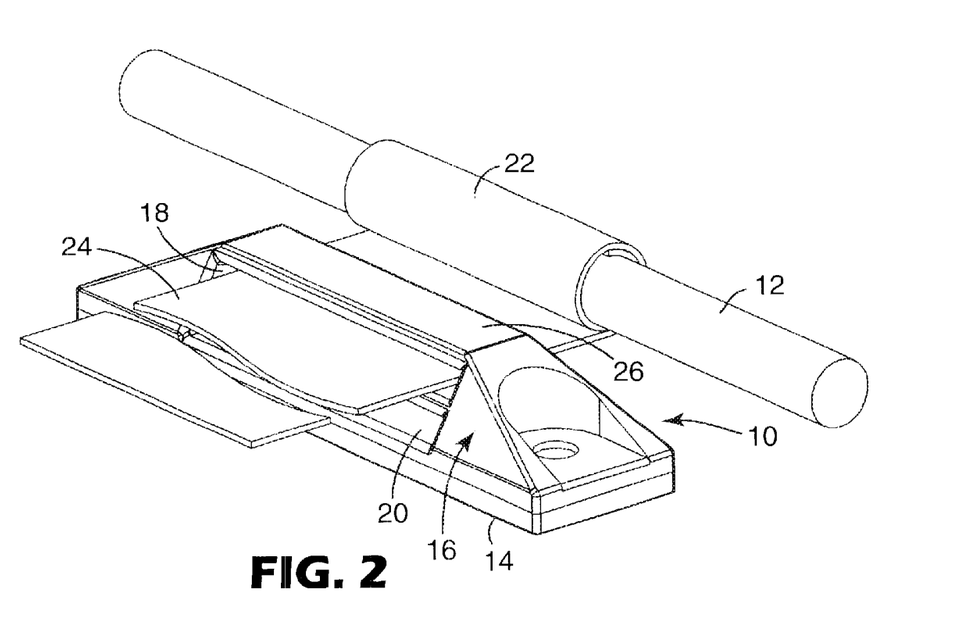
FIG. 2 shows a perspective view of the initial step of assembly of a cable retainer according to the present invention.

FIGS. 2–7 show how a cable 12 may be secured to a bracket 10 using a fastening strip 22 that has the capability of self-engagement using any of a variety of means including adhesive engagement or mechanical fastening using interference elements like those found on surfaces of hook and loop fasteners. FIG. 2 shows a cable 12 held inside a first wrap of a strip 22 of hook and loop fastener that maintains its wrapped condition by interference and engagement between hooks on one side of the strip 22 and loops on the other. A tail 24 extending from the fastening strip 22 has a size suitable for insertion into the first slot 18, of the slotted projection 16 to draw the cable 12 into abutment with the outer surface 26 of the projection 16.

Figure 3:
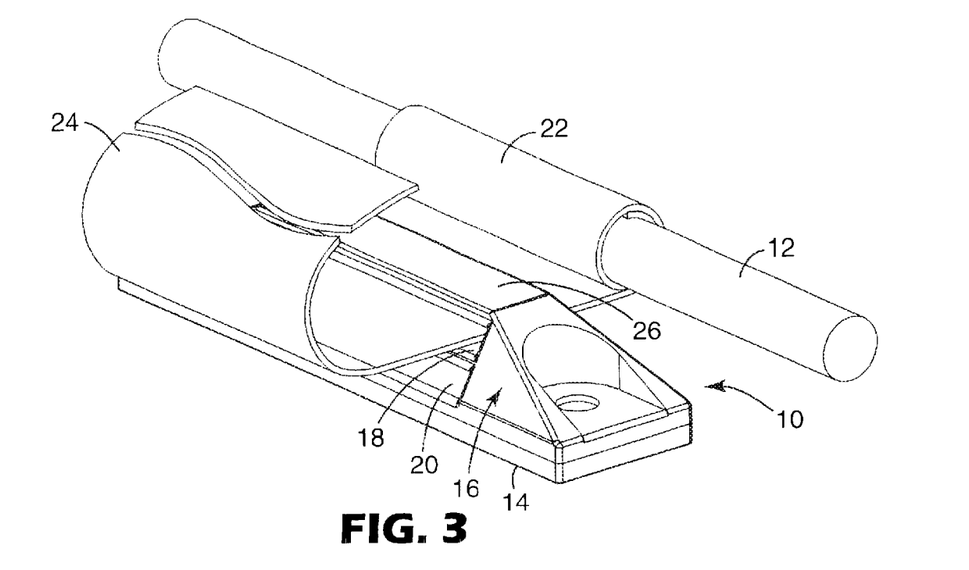
FIG. 3 provides perspective view illustrating the formation of a wrapped binding to hold a cable to a slotted bracket according to the present invention.
Figure 4:
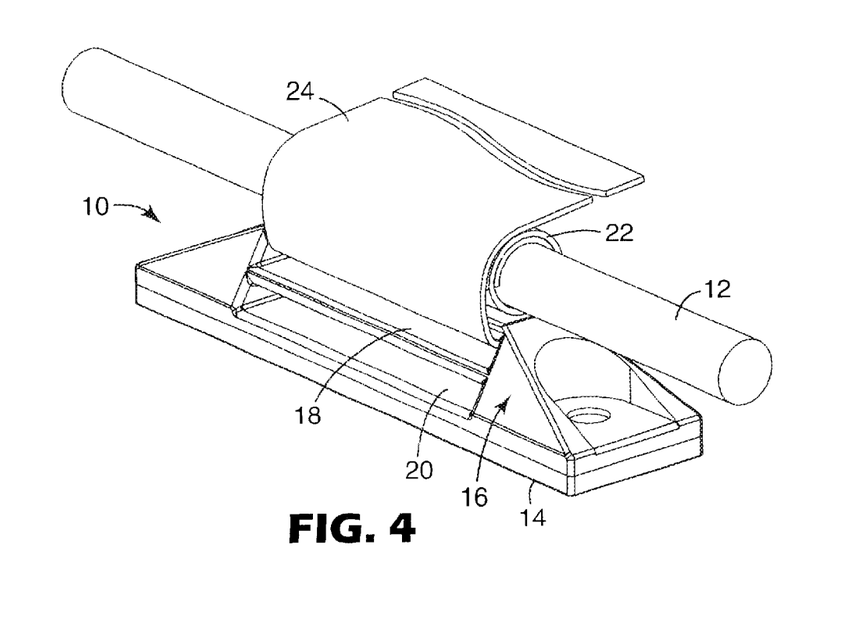
FIG. 4 is a perspective view showing overlapping engagement between wraps of a retainer strip used to bind elongate objects to a slotted bracket according to the present invention.
Figure 5:
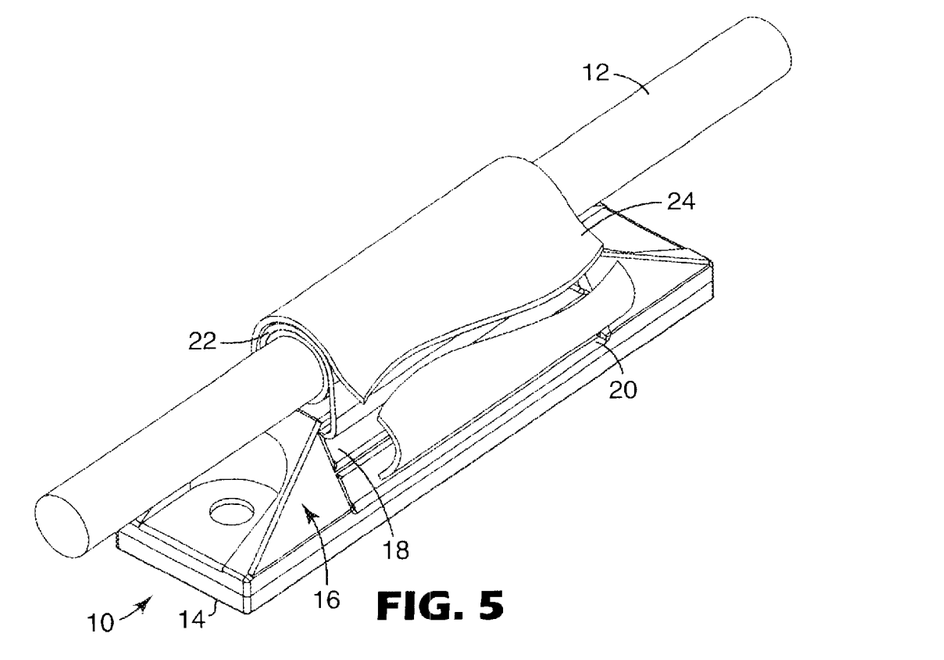
FIG. 5 provides a perspective view of a cable held against a slotted bracket using a double wrap of a retainer strip.
Figure 6:
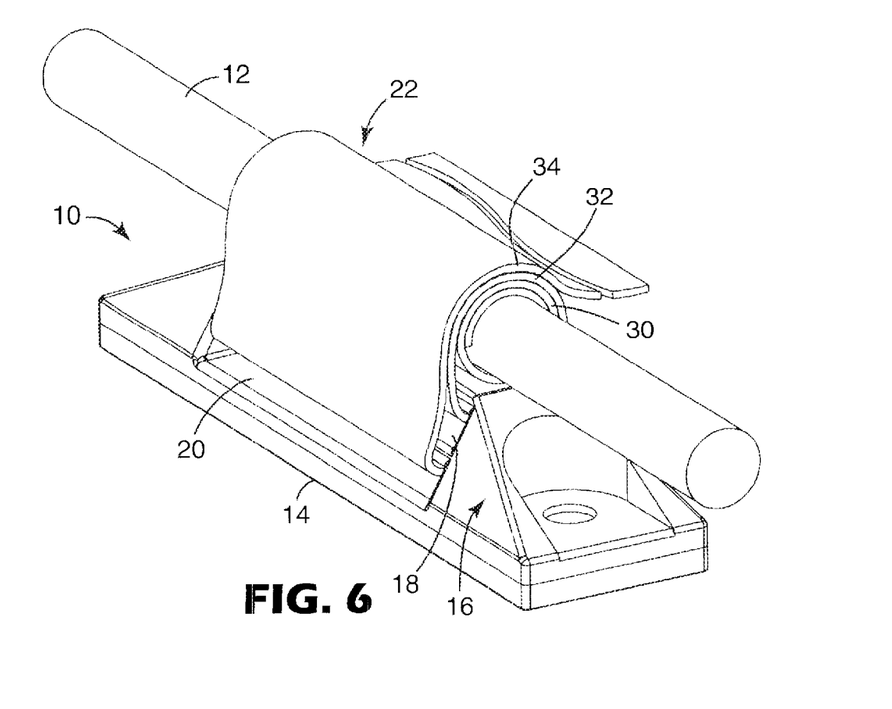
FIG. 6 is a perspective view showing a fully wrapped binding of a retainer strip used to secure an elongate object, such as a cable, to a slotted bracket according to the present invention.

FIG. 3 illustrates how the tail 24 may be wrapped upon itself to form a second wrap of the fastening strip 22 around the cable 12. Formation of the second wrap includes applying tension to the tail 24 for tight attachment of the cable 12 against the outer surface 26 of the projection 16. Interference between hooks and loops of the first and second wraps of the fastening strip 22 provides relatively secure attachment of the cable 12 to the projection 16 as shown in FIG. 4. The tension in the tail 24 of the retainer strip 22 and the holding force applied to the cable 12 increases during formation of a third wrap of the fastening strip 22 around the cable 12. FIG. 5 illustrates formation of the third wrap of the fastening strip 22 that requires insertion of the tail 24 through the second slot 20 followed by tightening the tail 24 around the cable 12 and over the second wrap for engagement of hooks and loops between the second and third wraps of the fastening strip 22. This produces a length of the cable 12 tightly bound to a bracket 10 as shown in FIG. 6 of the present invention. The resulting secured cable 12 includes three portions 30, 32, 34, of the fastening strip 22 mechanically fastened together to provide a strong link between the cable 12 and the projection 16 of the bracket 10.

A bracket 10 according to the present invention provides a point for attaching elongate objects 12 in a number of applications, particularly in the routing of wires in electrical installations including wire harnesses for vehicles and vessels such as ships, aeroplanes, trains, trucks, vans, automobiles and other forms of transportation. Following the design of wiring systems, brackets 10, attached to bulkheads, or other surfaces of vessels and vehicles, identify the route that will be followed by the wires and cables used to form the wire harness. Each bracket 10 may be fabricated from metal or plastic and attached by its base 14 to a surface using a variety of methods of bonding including adhesive bonding, and mechanical bonding using metal rivets, for example. Suitable positioning of multiple brackets allows the stringing of long lengths of wires and cables. The height of the projection 16 of a bracket 10 according to the present invention may be selected to provide a low profile bracket 10 suitable for use in confined regions of a vehicle or building.

Figure 7:
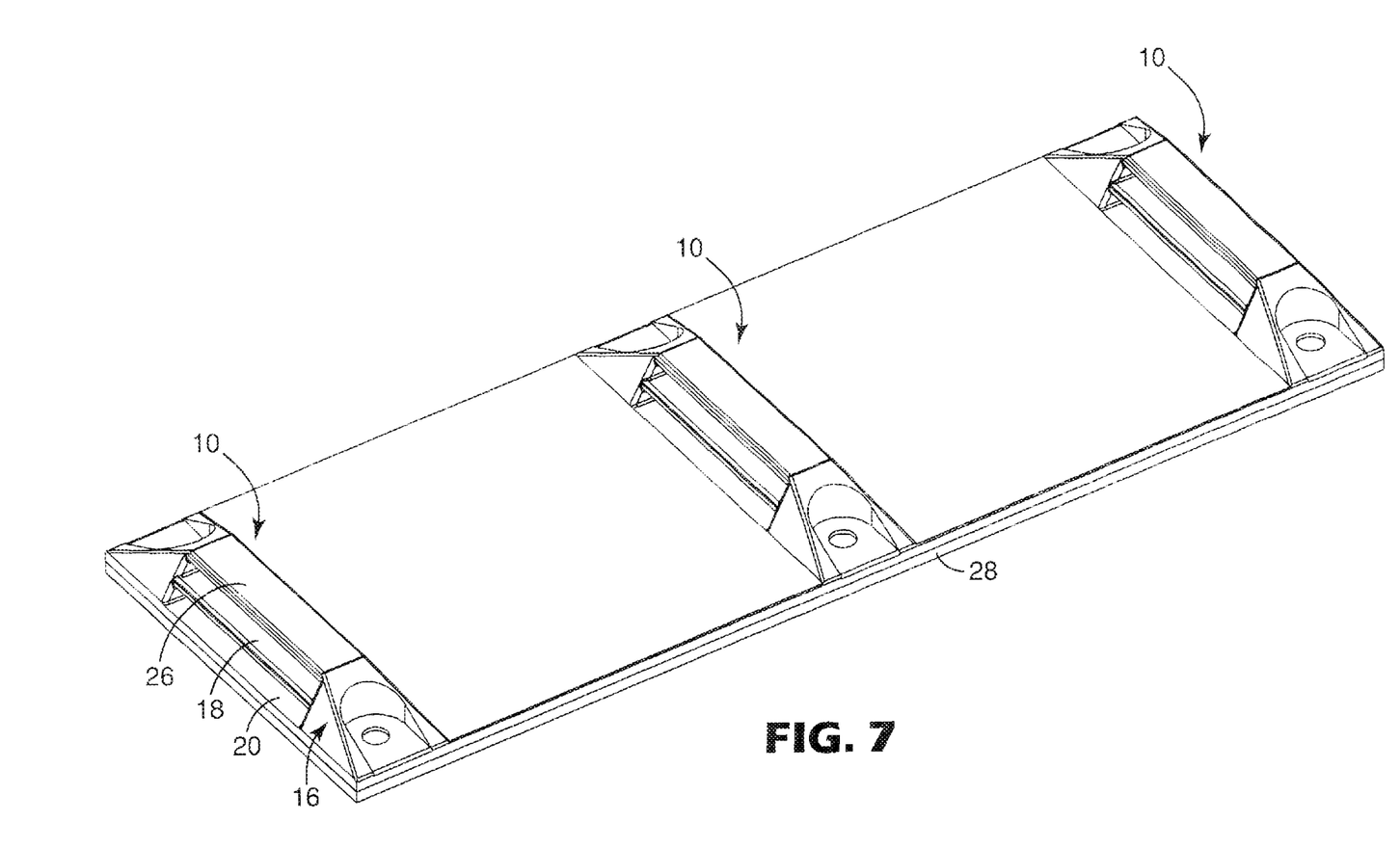
FIG. 7 is a perspective view showing a strap having a plurality of slotted brackets molded along its length.

FIG. 7 shows that a plurality of brackets 10 may be joined together to provide a transverse strap 28 having multiple brackets 10 at fixed intervals. The transverse strap 28 facilitates attachment of wires and cables with convenient separation between points of secure cable attachment. While FIG. 7 illustrates a number of brackets 10 perpendicular to the longitudinal axis of the transverse strap 28, it will be appreciated that brackets 10 may be placed on the transverse strap 28 having any convenient orientation to its longitudinal axis.

Figure 8:
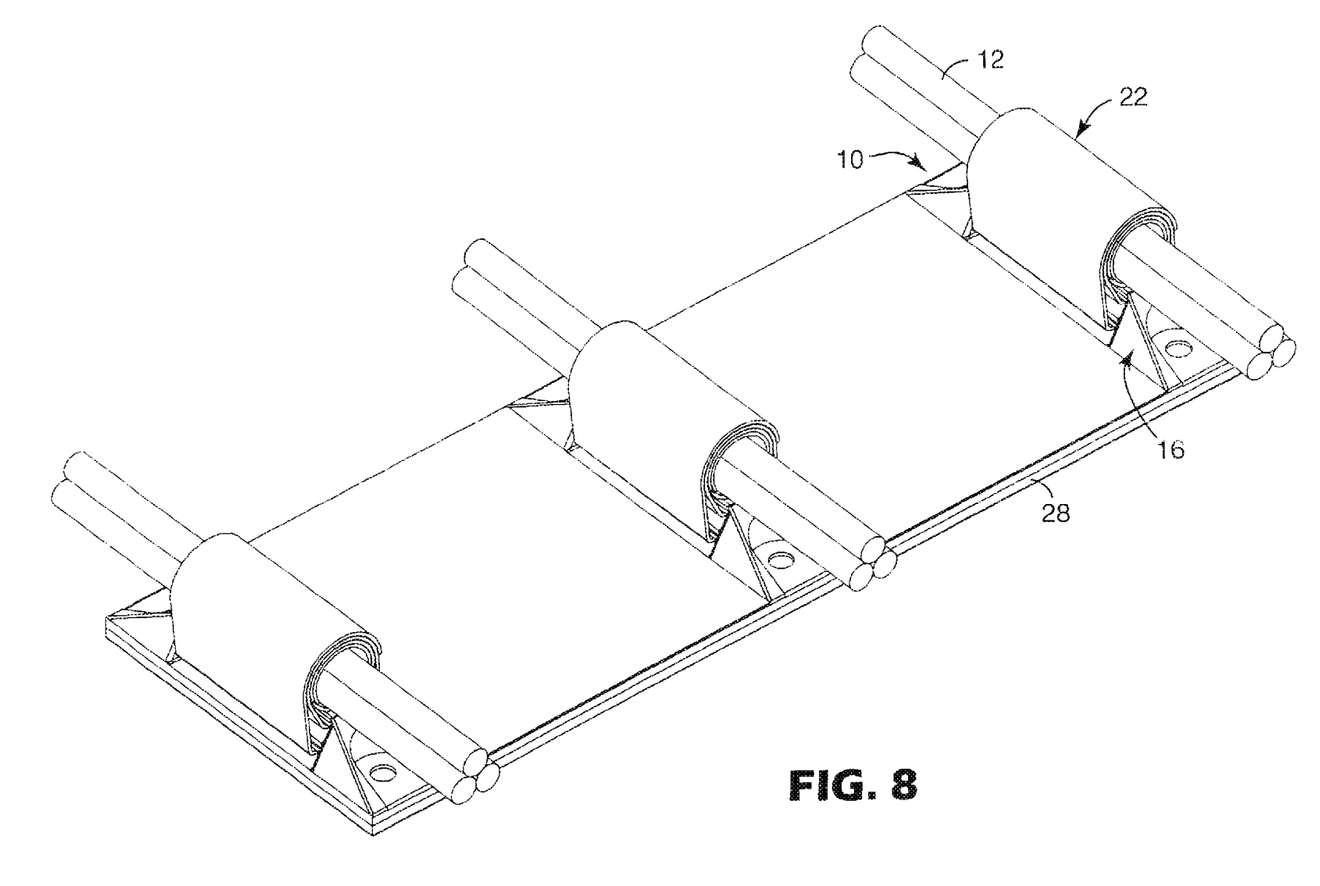
FIG. 8 shows the strap depicted in FIG. 7 using fastening strips to attach groups of wires or cables to slotted brackets to produce wrapped bindings associated with cable retainers according to the present invention.

FIG. 8 shows how several cables 12 may be attached by fastening strips 22 to slotted brackets 10 having their position fixed during molding of the transverse strap 28 from a suitable plastic resin material. A benefit of transverse straps 28, including slotted brackets 10 according to the present invention, is the capability they provide for organizing complex wiring schemes used to connecting active components and devices in machines, ships, trains and vehicles and the like that require current and signal carrying wires and cables. Planned positioning of transverse straps 28, secured to the bulkhead of a ship or plane or a surface of a vehicle body, for example, determines the directions that cables will run and the number of support points (cable retainers) that will be used to stabilize the cable connecting structure. Although FIG. 8 shows lengths of three cables held to a slotted bracket 10 by a wrapped binding, it will be appreciated that a cable retainer according to the present invention could accommodate cables fewer or greater in number than those specifically represented in FIG. 8.

Figure 9:
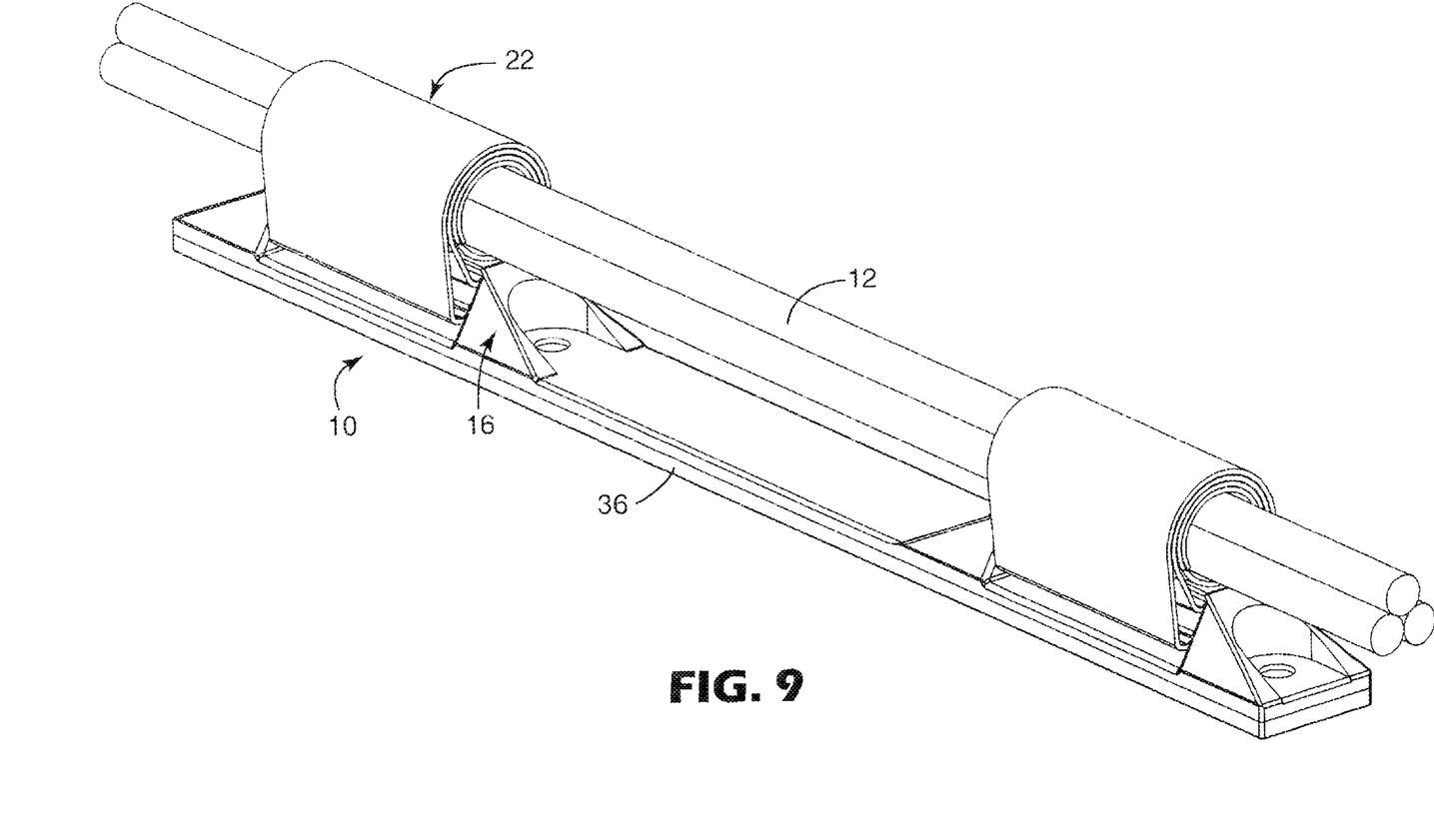
FIG. 9 illustrates an alternative strap supporting brackets for multi-point retention of one or more wires or cables extending parallel to the longitudinal axis of the strap.

FIG. 9 illustrates an axial strap 36 differing from the transverse strap 28 by having the longitudinal axis of each slotted bracket 10 co-axial with the longitudinal axis of the strap 36. As used herein, the term transverse strap 28 refers to a ribbon of a flexible material having on at least one of its surfaces a plurality of slotted brackets 10 each having its longitudinal axis perpendicular to the longitudinal axis of the flexible ribbon. The term axial strap 36 describes a ribbon of flexible material having on at least one of its surfaces a plurality of slotted brackets 10 each having its longitudinal axis parallel to the longitudinal axis of the flexible ribbon.

An axial strap 36 may be designed to provide support points of equal spacing along a length of cable, as shown in FIG. 9. Other designs may alter the spacing between slotted brackets 10 to provide alternate cable support schemes inside a vessel or vehicle structure. Extensive wiring schemes may use a combination of transverse straps and axial straps for optimum positioning and support of wiring systems particularly vehicle wiring harnesses. Transverse and axial straps 28, 36 may be fabricated from metal or plastic, preferably a tough, flexible plastic material, and attached to a surface using a variety of methods of bonding including adhesive bonding, and mechanical bonding using metal rivets, for example. Adhesive attachment is preferred to prevent damage to the containment structure used to house wiring schemes organized using detachable bindings according to the present invention.

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A detachable binding device for at least one elongate strand comprising:

a bracket including a base portion and a slotted projection having a first slot and a second slot aligned in parallel with said first slot between said first slot and said base portion; and a fastening strip including a first gripping surface and a second gripping surface, said fastening strip held in a loop around the at least one elongate strand by engagement of said first gripping surface with said second gripping surface, said fastening strip passing through said first slot to form a first wrap around a length of the at least one elongate strand to hold the at least one elongate strand against the slotted projection said fastening strip then passing through said second slot to form a second wrap over said first wrap and said length of the at least one elongate strand for secure retention of the at least one elongate strand against said slotted projection wherein said first gripping surface on an end portion of said fastening strip engages said second gripping surface on a portion of said fasting strip, said binding device being detachable from the length of the at least one elongate strand and said bracket by separation of said first gripping surface of said end portion from said second gripping surface of said portion of said fastening strip and withdrawal of said fastening strip from said second slot and said first slot to release the length of the at least one elongate strand from contact with said bracket.

2. The detachable binding device of claim 1, wherein the at least one elongate strand is selected from the group consisting of hoses, wires and cables.

3. The detachable binding device of claim 1, wherein said first gripping surface has a covering of a plurality of hook fastening elements.

4. The detachable binding device of claim 1, wherein said second gripping surface has a covering of a plurality of loop fastening elements.

5. The detachable binding device of claim 1, wherein said bracket comprises a material selected from the group consisting of metals and plastic resins.

6. The detachable binding device of claim 5, wherein said base includes means to attach said bracket to a surface.

7. The detachable binding device of claim 6, wherein said means to attach said bracket are selected from the group consisting of adhesive and mechanical means of attachment.

* * * * *

UNITED STATES PATENT AND TRADEMARK OFFICE
CERTIFICATE OF CORRECTION

PATENT NO. : 6,683,258 B1
DATED : January 27, 2004
INVENTOR(S) : Tracy, David A.

It is certified that error appears in the above-identified patent and that said Letters Patent is hereby corrected as shown below:

Column 1,
Line 5, delete "1." before "Field"
Line 14, delete "2." before "Description"
Line 41, delete "reentry" and insert in place thereof -- re-entry --

Column 2,
Line 2, delete "," and insert in place thereof -- . --
Line 27, delete "as a wires" and insert thereof -- as wires --

Column 3,
Line 54, delete "." " and insert in place thereof -- . --

Column 6,
Line 34, after the word "projection" insert -- , --
Line 41, delete "fasting" and insert thereof -- fastening --

Signed and Sealed this

Twenty-second Day of June, 2004

JON W. DUDAS
*Acting Director of the United States Patent and Trademark Office*